United States Patent
Zou et al.

(10) Patent No.: US 10,553,025 B2
(45) Date of Patent: Feb. 4, 2020

(54) METHOD AND DEVICE FOR EFFICIENT BUILDING FOOTPRINT DETERMINATION

(71) Applicant: Robert Bosch GmbH, Stuttgart (DE)

(72) Inventors: Lincan Zou, San Jose, CA (US); Liu Ren, Cupertino, CA (US); Zeng Dai, Sunnyvale, CA (US); Cheng Zhang, Irvine, CA (US)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 15/921,072

(22) Filed: Mar. 14, 2018

(65) Prior Publication Data
US 2019/0287300 A1    Sep. 19, 2019

(51) Int. Cl.
*G06T 17/20*    (2006.01)
*G06T 17/00*    (2006.01)

(52) U.S. Cl.
CPC ............ *G06T 17/20* (2013.01); *G06T 17/005* (2013.01); *G06T 2210/04* (2013.01)

(58) Field of Classification Search
CPC ................................ G06T 17/05; G06T 17/20
See application file for complete search history.

(56) References Cited

U.S. PATENT DOCUMENTS

| | | | | |
|---|---|---|---|---|
| 6,031,544 A * | 2/2000 | Yhann | ...................... | H04N 1/58 345/620 |
| 7,106,328 B2 | 9/2006 | Royan | | |
| 2014/0267248 A1 | 9/2014 | Zou et al. | | |
| 2014/0267282 A1 | 9/2014 | Ren et al. | | |
| 2016/0307363 A1 | 10/2016 | Zou et al. | | |
| 2016/0377440 A1 * | 12/2016 | Dorum | ................... | G01C 21/30 702/150 |

OTHER PUBLICATIONS

Wang, Ruisheng, et al. "Automatic extraction of building boundaries using aerial LiDAR data." Journal of Applied Remote Sensing 10.1 (2016): 016022. (Year: 2016).*
Wang, Lu, and Chee-hung Henry Chu. "3D building reconstruction from LiDAR data." 2009 IEEE International Conference on Systems, Man and Cybernetics. IEEE, 2009. (Year: 2009).*

(Continued)

*Primary Examiner* — Daniel F Hajnik
(74) *Attorney, Agent, or Firm* — Maginot, Moore & Beck LLP

(57) ABSTRACT

A method and device for determining a footprint of a 3D structure are disclosed. The method includes: receiving mesh data for the 3D structure that includes vertices and edges that form polygons of the 3D structure; determining a connection graph including candidate nodes and candidate lines by (i) identifying all edges having a vertex that is less than threshold height value, and (ii) mapping the identified edges and vertices thereof onto a 2D plane; determining an adjacency list that indicates, for each candidate node, which other candidate nodes are connected to the candidate node by a candidate line; and generating a footprint of the 3D structure based on the connection graph and the adjacency list, the footprint including vertices corresponding to a selection of the candidate nodes and including edges corresponding to a selection of the candidate lines.

20 Claims, 13 Drawing Sheets

(56) References Cited

OTHER PUBLICATIONS

NPL Video "Digitizing Building Footprints with ArcMap Rectangle Tool", https://www.youtube.com/watch?v=YdeRhpDmf2s, published Jun. 20, 2015; select screenshots included. (Year: 2015).*

Alboul, Lyuba, and Georgios Chliveros. "A system for reconstruction from point clouds in 3D: Simplification and mesh representation." 2010 11th International Conference on Control Automation Robotics & Vision. IEEE, 2010. (Year: 2010).*

Wang, Oliver et al., "A Bayesian Approach to Building Footprint Extraction from Aerial LIDAR Data", Proceedings of the Third International Symposium on 3D Data Processing, Visualization, and Transmission, IEEE Computer Society, 2006 (8 pages).

Zhang, Keqi et al., "Automatic Construction of Building Footprints from Airborne LIDAR Data", IEEE Transactions on Geoscience and Remote Sensing, 2006 (11 pages).

Guercke, Richard et al., "Building Footprint Simplification Based on Hough Transform and Least Squares Adjustment", Proceedings of the 14th Workshop of the ICA commission on Generalization and Multiple Representation, 2011 (9 pages).

Haunert, Jan-Henrik et al., "Optimal and Topologically Safe Simplification of Building Footprints", Proceedings of the 18th SIGSPATIAL International Conference on Advances in Geographic Information Systems, 2010 (10 pages).

\* cited by examiner

230

232
Initialize the connection graph with a plurality of candidate nodes and a plurality of candidate lines corresponding to all edges having any portion lower than a predefined threshold height value or within a predefined threshold distance from the ground of the virtual environment.

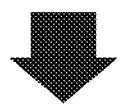

234
Simplify the connection graph by merging any candidate nodes that near one another and/or merging any candidate lines that are substantially parallel and near one another.

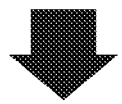

236
Move any candidate nodes that are near a respective candidate line onto the respective candidate line and split the respective candidate line into two candidate lines, each having one end at the respective candidate node.

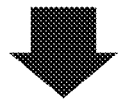

238
Generate new candidate nodes positioned at any intersection of two candidate lines and split each of the respective two candidate lines into two new candidate lines, each having one end at the respective new candidate node.

FIG. 6

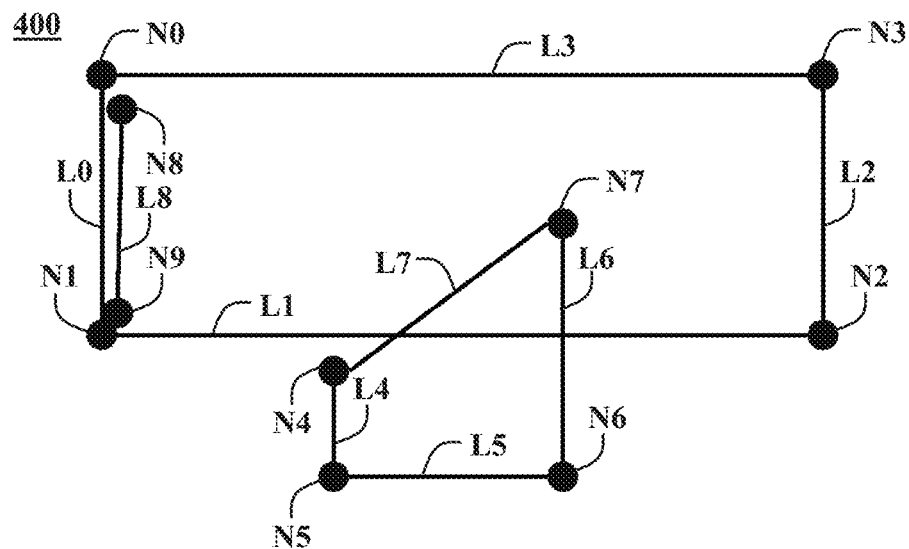
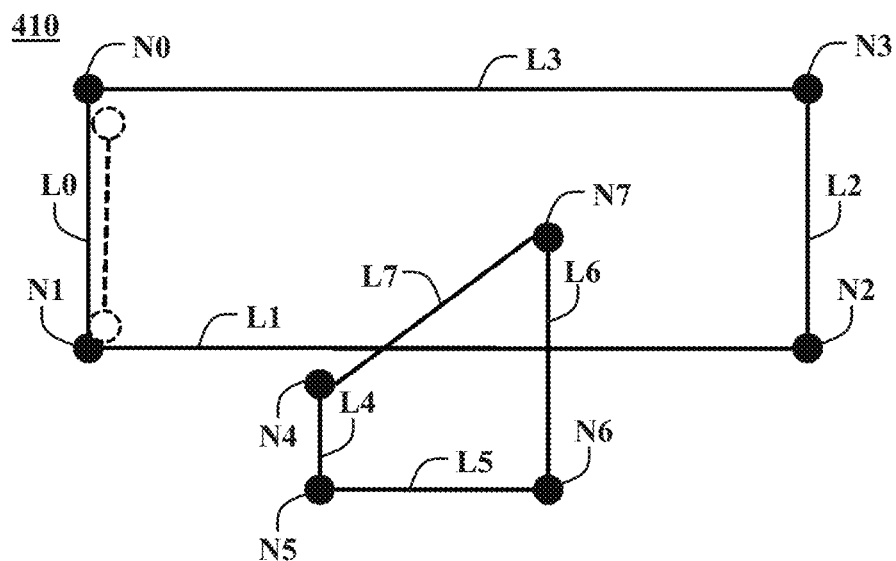
FIG. 7

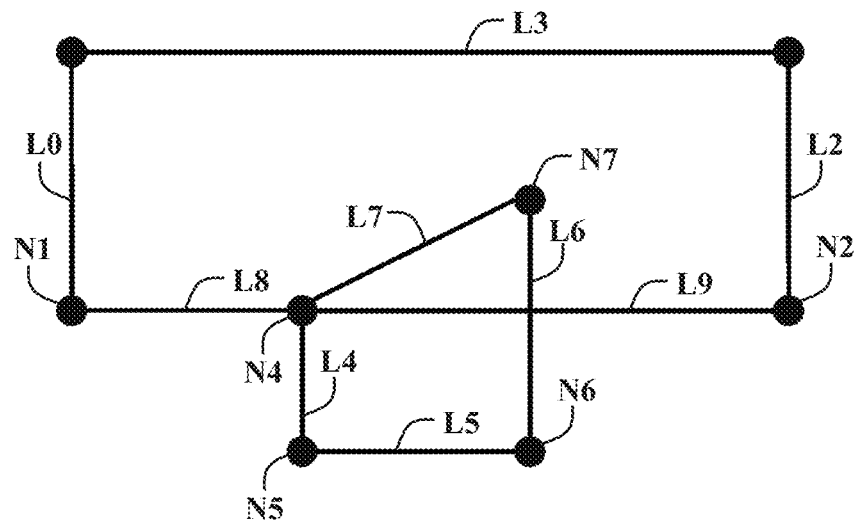
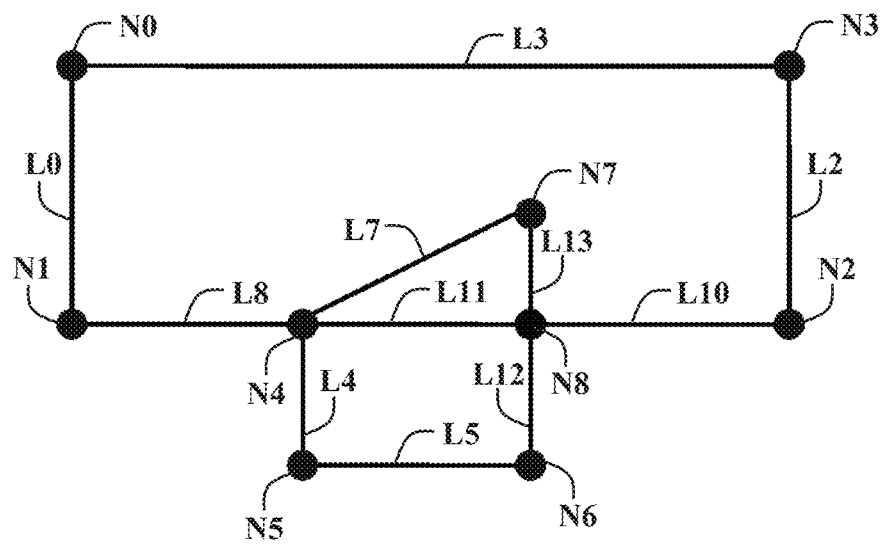
FIG. 9

500

| Candidate Node | Connected Candidate nodes |
|---|---|
| N0 | N1, N3 |
| N1 | N0, N4 |
| N2 | N3, N8 |
| N3 | N0, N2 |
| N4 | N1, N5, N7, N8 |
| N5 | N4, N6 |
| N6 | N5, N8 |
| N7 | N4, N8 |
| N8 | N2, N4, N6, N7 |

FIG. 10

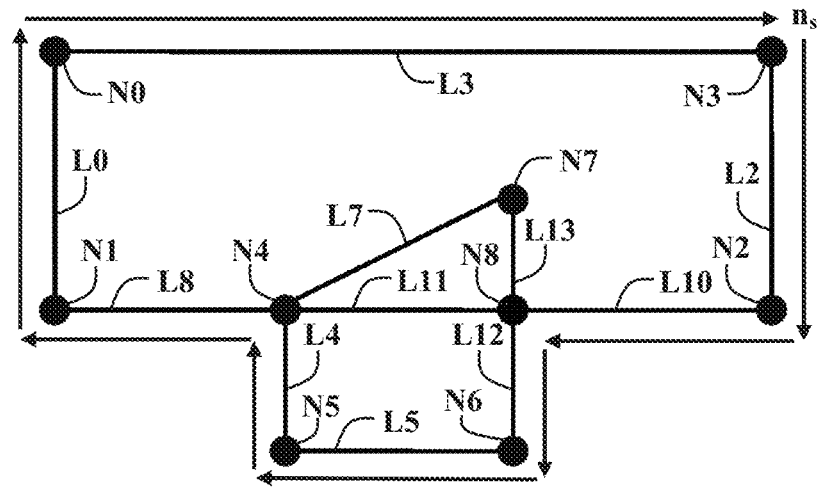
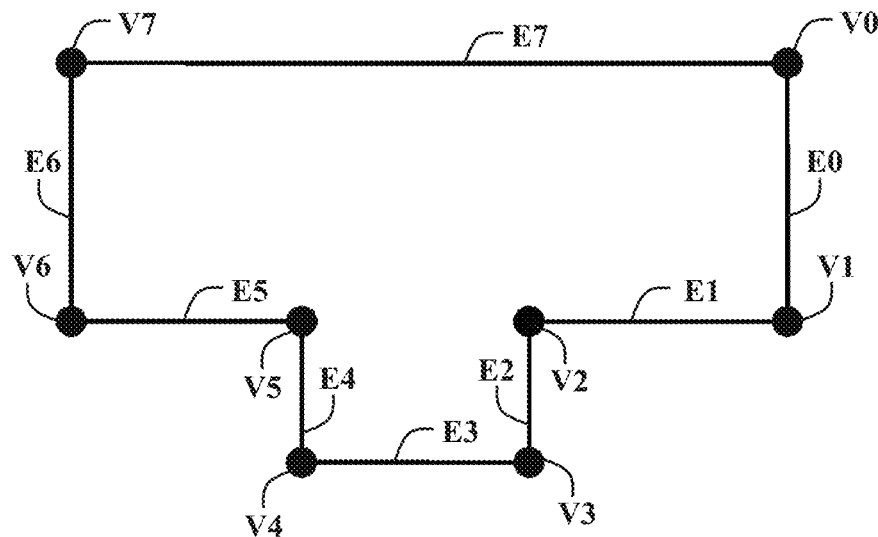
FIG. 12

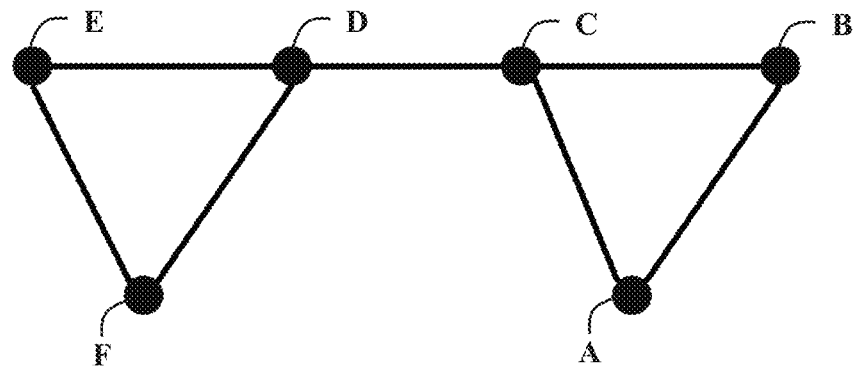
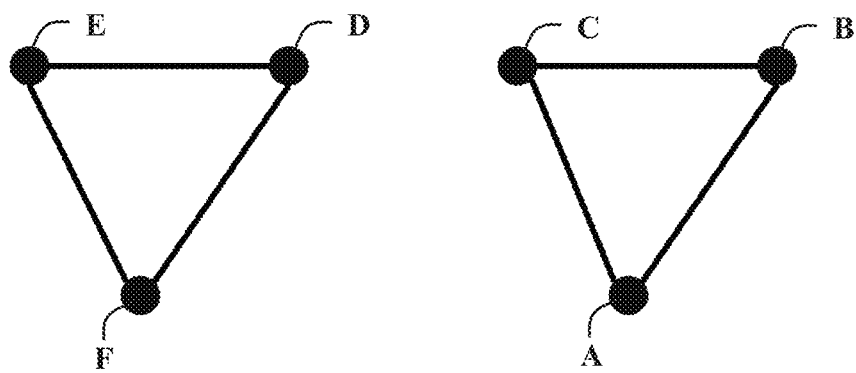
FIG. 13

METHOD AND DEVICE FOR EFFICIENT BUILDING FOOTPRINT DETERMINATION

FIELD

The method and device disclosed in this document relates to three-dimensional rendering and, more particularly, to efficient determination of two-dimensional building footprints based on three-dimensional building data.

BACKGROUND

Unless otherwise indicated herein, the materials described in this section are not prior art to the claims in this application and are not admitted to the prior art by inclusion in this section.

Many modern software applications display three-dimensional representations of objects and scenes as part of a user interface. Three-dimensional (3D) graphics are used in a wide range of applications including video games, simulations, virtual reality applications, geospatial information applications, and applications for mapping and navigation. In many applications, 3D graphics are more useful than two-dimensional (2D) graphics at depicting real-world environments and locations because the natural interaction between humans and the real-world occurs in three dimensions.

3D graphics are typically generated as a plurality of polygons that form the shapes of objects and other structures in a 3D virtual environment. In modern 3D graphics, the final display often includes additional graphical details that go beyond a simple rendering of polygons to provide additional detail and realism. Particularly, modern 3D graphics often include numerous graphical effects including, but not limited to, lighting effects, texturing, and shadow effects that the processor applies to the polygons to display the 3D environment. For example, rendered polygons typically receive one or more textures that simulate the appearance of materials in the real world such as wood, stone, metal, cloth, and many other materials. The appearance of a scene is also heavily influenced by the virtual light sources that illuminate the scene and form the basis for shadow effects. Finally, since most computing devices only display graphics with a two-dimensional (2D) display, the 3D graphics are converted into a rasterized 2D array of pixels for display. The 2D display depicts portions of the 3D scene in a similar manner to how a camera takes a 2D photograph of a 3D scene in the real world.

One particular useful application for 3D graphics is in 3D navigation map applications, such as those available on smart phones, tablet computers, and in-car infotainment systems. 3D building mesh data is often provided as a dataset for such 3D navigation map applications. FIG. 1 illustrates an exemplary polygon mesh 10 used by a 3D navigation map application to render a 3D building 12. However, the datasets used in such 3D navigation map applications often do not include 2D footprints for the 3D buildings, or only provide an over-simplified 2D footprint for some 3D buildings. 2D footprints are quite useful in a 3D navigation map application for several features.

However, accurate determination of 2D footprint faces several challenges. First, the method generally needs to work at run-time on hardware having relatively weak processing capabilities and with an existing dataset (such as those which may be commercially available), so as to not introduce additional effort in compiling the dataset and to minimize the impact on existing dataset update processes. However, many footprint generation methods are either efficient and inaccurate or accurate and inefficient, such that there is a trade-off between accuracy and performance. Second, the method generally needs to work with input data that contains separated buildings. However, many existing methods can't process input data which contains separated buildings. Accordingly, it would be advantageous to provide a method of determining 2D footprints that is both accurate and efficient. Additionally, it would be further advantageous if the method can process input data which contains separated buildings.

SUMMARY

A method for determining a two-dimensional (2D) footprint of a three-dimensional (3D) structure in a virtual environment is disclosed. The method includes the steps of: receiving, with a processor, mesh data for at least one 3D structure, the mesh data including positions of a plurality of vertices which are connected by a plurality of edges to form a plurality of polygons that form the at least one 3D structure; determining, with the processor, a connection graph including a plurality of candidate nodes and a plurality of candidate lines by (i) identifying all edges in the plurality of edges having a vertex that is less than threshold height value, and (ii) determining the plurality of candidate lines and the plurality of candidate nodes by mapping the identified edges and vertices thereof onto a 2D plane; determining, with the processor, an adjacency list that indicates, for each candidate node in the plurality of candidate nodes, which other candidate nodes in the plurality of candidate nodes are connected to the respective candidate node by a candidate line in the plurality of candidate lines; and generating, with the processor, a footprint of the at least one 3D structure based on the connection graph and the adjacency list, the footprint including vertices corresponding to a selected group of candidate nodes from the plurality of candidate nodes and including edges corresponding to a selected group of candidate lines from the plurality of candidate lines.

A graphical display system is also disclosed. The graphical display system includes: a display device; a memory; and a processor operatively connected to the display device and the memory. The processor is configured to: receive mesh data for at least one three-dimensional (3D) structure, the mesh data including positions of a plurality of vertices which are connected by a plurality of edges to form a plurality of polygons that form the at least one 3D structure; determine a connection graph including a plurality of candidate nodes and a plurality of candidate lines by (i) identifying all edges in the plurality of edges having a vertex that is less than threshold height value, and (ii) determining the plurality of candidate lines and the plurality of candidate nodes by mapping the identified edges and vertices thereof onto a two-dimensional (2D) plane; determine an adjacency list that indicates, for each candidate node in the plurality of candidate nodes, which other candidate nodes in the plurality of candidate nodes are connected to the respective candidate node by a candidate line in the plurality of candidate lines; and generate a footprint of the at least one 3D structure based on the connection graph and the adjacency list, the footprint including vertices corresponding to a selected group of candidate nodes from the plurality of candidate nodes and including edges corresponding to a selected group of candidate lines from the plurality of candidate lines.

BRIEF DESCRIPTION OF THE DRAWINGS

The foregoing aspects and other features of the method and device are explained in the following description, taken in connection with the accompanying drawings.

FIG. 6 shows an exemplary process for determining the connection graph.

FIG. 7 illustrates an exemplary simplification of an initialized connection graph.

FIG. 9 shows illustrates an exemplary completion of the corrected connection graph of FIG. 8.

FIG. 10 shows an exemplary adjacency list for the completed connection graph of FIG. 9.

FIG. 12 shows an exemplary determination of a 2D footprint from the completed connection graph of FIG. 9.

FIG. 13 shows an exemplary post-processing of a generated 2D footprint.

DETAILED DESCRIPTION

Figure 1:
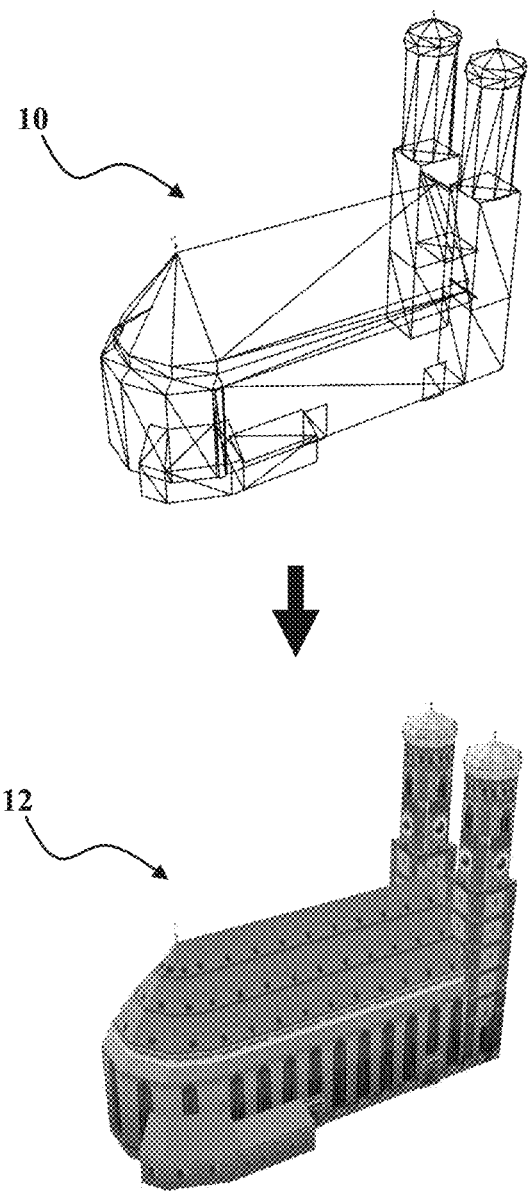
FIG. 1 shows an exemplary polygon mesh and a corresponding rendered 3D building.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

As used herein, the term "object" or "3D object" refers to data that correspond to a plurality of vertices that form polygons in a virtual environment to depict a model of a single object in the larger virtual environment. As used herein, the term "structure" or "3D structure" refers to an object with polygons that are positioned and oriented in the 3D virtual environment to stand on a virtual representation of ground or the surface of the earth. Common examples of structures include representations of manmade objects such as buildings, bridges, monuments, and other artificial constructions. Natural structures include representations of trees and vegetation, cliffs, rock outcroppings, and other objects that correspond to natural features. Structures in a 3D virtual environment extend from a surface of the virtual representation of the ground. The polygons that define each structure provide a shape for the structure, and the structure is also oriented in a predetermined manner to emerge from the ground in an expected manner. In one embodiment of a computing device using software and hardware that is compatible with the OpenGL 3D graphics standard, the orientation of a structure is specified using a rotational matrix to orient the structure with the base of the structure engaging the ground and other polygons in the structure extending from the ground. For example, a 3D object representing a building includes a base that corresponds to the foundation of the building engaging the ground in the virtual environment. The polygons in the structure that extend upward from the ground are referred to as "walls," although the polygons do not necessarily have to depict walls of a building.

As used herein, the term "footprint" as applied to a structure refers to the a set of polygon vertices in a structure that correspond to the outermost coordinates for the structure, as viewed from overhead in the same manner as in a conventional two-dimensional map, that intersect with a ground surface or ground plane in a virtual environment correspond. For example, if the structure is a simple cube that rests on the ground of the virtual environment, then the footprint is defined by the locations of the four bottom corners and edges of the cube as viewed from above. The footprint does not include outermost polygon vertices that are above or below the ground level, such as structures that are formed with overhangs and other projections that extend from the center of the building as viewed from above, but do not contact the ground or such as structures that are formed having underground portions that extend beyond the ground level extent of the structure.

Computing System

Figure 2:
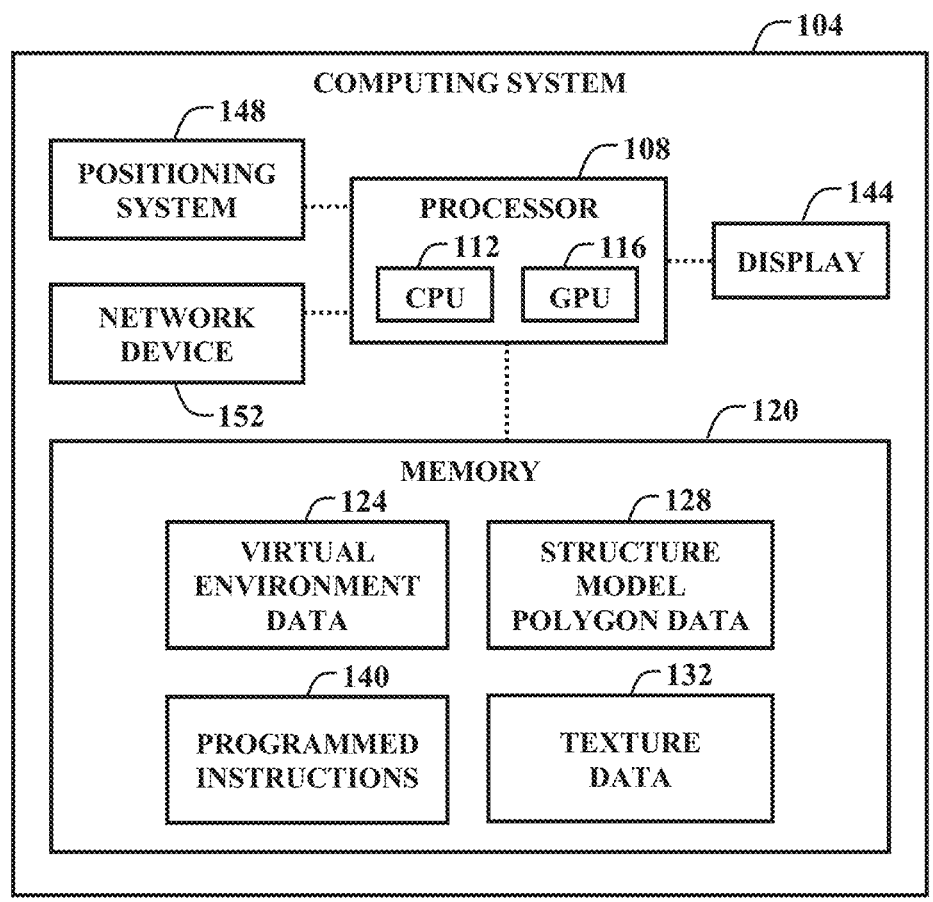
FIG. 2 is a schematic diagram of a computing device that is configured to determine two-dimensional (2D) footprints of 3D buildings.

FIG. 2 depicts a computing system 104 (which may also be referred to herein as a "graphical display system") that generates a graphical display of a 3D virtual environment including a representation of a ground surface, such as the surface of the Earth, with ground lighting textures or shadow textures applied to the regions surrounding the structures and to the polygons that depict walls of the structures. The computing system 104 includes a processor 108, memory 120, display 144, optional positioning system 148, and optional network device 152. Hardware embodiments of the computing system 104 include, but are not limited to, personal computer (PC) hardware, embedded system hardware including embedded computing hardware for use in a motor vehicle, and mobile electronic devices including smartphone and tablet computing devices.

In the computing system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device. In one embodiment, the CPU is a commercially available central processing device that implements an instruction set such as one of the x86, ARM, Power, or MIPs instruction set families. The GPU includes hardware and software for display of both 2D and 3D graphics. In one embodiment, processor 108 executes software drivers and includes hardware functionality in the GPU 116 to generate 3D graphics using the OpenGL, OpenGL ES, or Direct3D graphics application programming interfaces (APIs). For example, the GPU 116 includes one or more hardware execution units that implement fragment shaders and vertex shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications, virtual reality applications, game applications, simulation applications, and any other software that is configured to generate 3D graphics. In at least one embodiment, the processor 108 executes a mapping and navigation program and generates 2D and 3D graphical output corresponding to maps and map features through the display device 144. The processor is configured with software and hardware functionality by storing programmed instructions in one or memories operatively connected to the processor and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the computing system 104 is deactivated or loses electrical power. The volatile memory includes static and dynamic random access memory (RAM) that stores software and data, including graphics data and map feature data, during operation of the computing system 104. In addition to the programmed instructions 140, the memory 120 includes virtual environment data 124, structure model polygon data 128, and texture data 132. The virtual environment data 124 includes a model of a virtual environment include ground terrain information, coordinates and orientation data for multiple 3D objects that are located in the virtual environment, and additional environmental data including virtual lighting sources that illuminate the virtual environment. The structure model polygon data 128 include a plurality of models for three-dimensional structures that are formed from multiple polygons. The data include vertices with three-dimensional coordinates that define a series of interconnected polygons, such as triangles, that form the shape of a structure in the 3D virtual environment. The processor 108 is configured to adjust the relative size and orientation of the each structure model to place the model in the 3D virtual environment, and a 3D virtual environment can include many copies and variations of a single structure model. The texture data 132 include a plurality of textures, which are typically 2D images, mapped to the surfaces of the structures in the 3D virtual environment to provide more realistic appearances to the polygon structure models.

The computing system 104 includes an optional network device 152 that is configured to send and receive data from external computing systems through a data network (not shown). Examples of the network device 152 include wired network adapters such as Ethernet and universal serial bus (USB) adapters, and wireless network adapters such as 3G or 4G wireless wide area network (WWAN), 802.11 or Bluetooth wireless local area network (WLAN) adapters. In some embodiments, the processor 108 retrieves virtual environment data 124, structure model polygon data 128, and texture data 132 from an external network for storage in the memory 120. In some embodiments, the memory 120 caches the graphics data and the processor 108 stores additional graphical data that is received through the network device 152 to update the contents of the memory 120.

The computing system 104 includes an optional positioning system device 148 that is operatively connected to the processor 108. Examples of positioning systems include global positioning system (GPS) receivers, radio triangulation receivers that identify a location of the computing system 104 with respect to fixed wireless transmitters, and inertial navigation systems. During operation, the processor 108 executes mapping and navigation software applications that retrieve location information from the positioning system 148 to identify a geographic location of the computing system 104 and to adjust the display of the virtual environment to correspond to the location of the computing system 104. In navigation applications, the processor 108 identifies the location and movement of the computing system 104 for the generation of routes to selected destinations and display of the routes in the 3D virtual environment.

In the computing system 104, the display 144 is either an integrated display device, such as an LCD or other display device, which is integrated with a housing of the computing system 104, or the display 144 is an external display device that is operatively connected to the computing system 104 through a wired or wireless interface to receive output signals from the processor 108 to generate a display of the 3D virtual environment. In an embodiment where the computing system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle.

Methods for Efficient Building Footprint Determination

Various methods and processes for determining a footprint of a 3D structure are described below. In the description of the methods, statements that the method is performing some task or function refers to a controller or general purpose processor executing programmed instructions stored in non-transitory computer readable storage media operatively connected to the controller or processor to manipulate data or to operate one or more components in the computing system 104 to perform the task or function. Particularly, the processor 108, CPU 112, and/or GPU 116 above may be such a controller or processor and the executed program instructions may be the programmed instructions 140 stored in the memory 120. Additionally, the steps of the methods may be performed in any feasible chronological order, regardless of the order shown in the figures or the order in which the steps are described.

Figure 3:
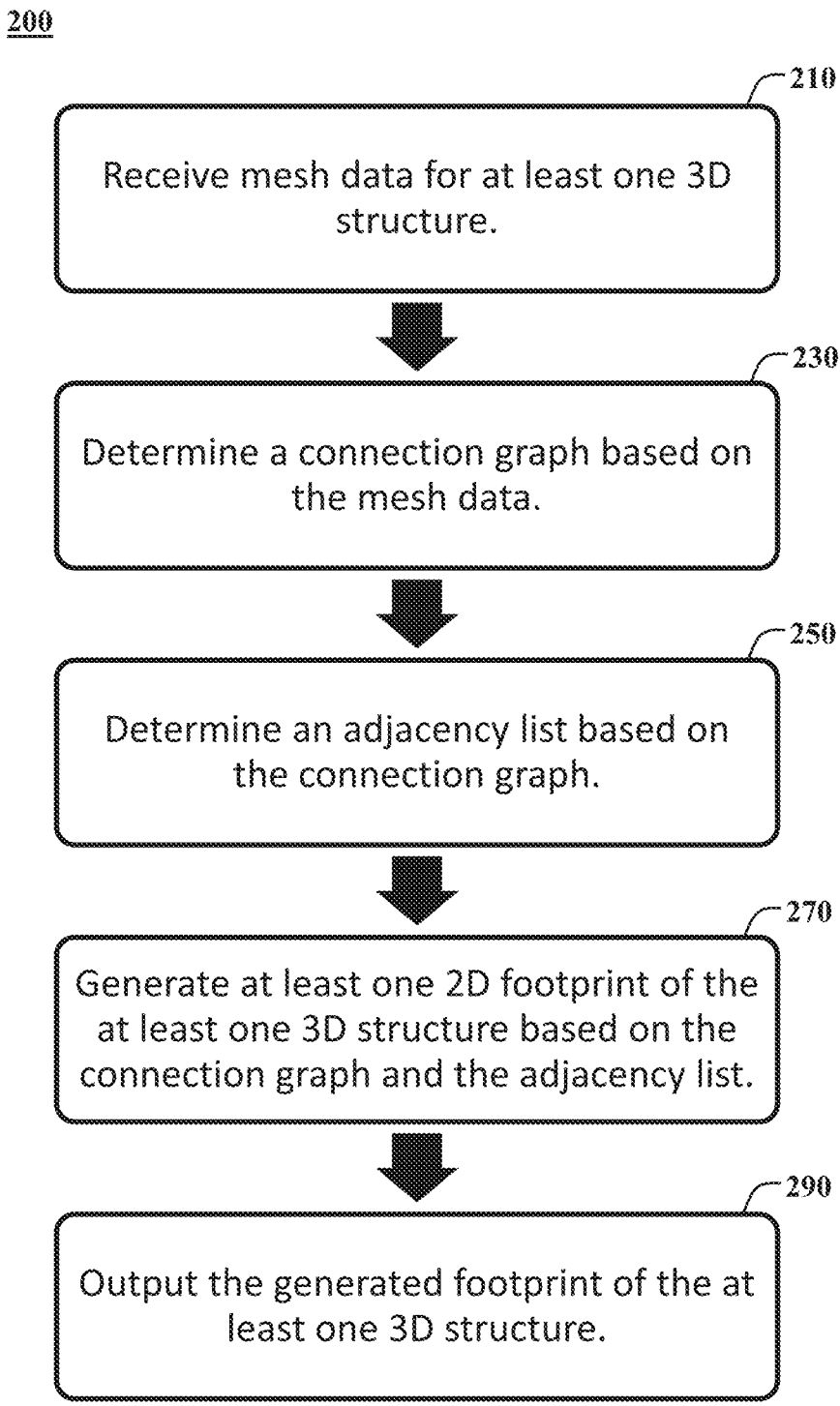
FIG. 3 shows a method for determining a footprint of a 3D structure in a virtual environment.
Figure 4:
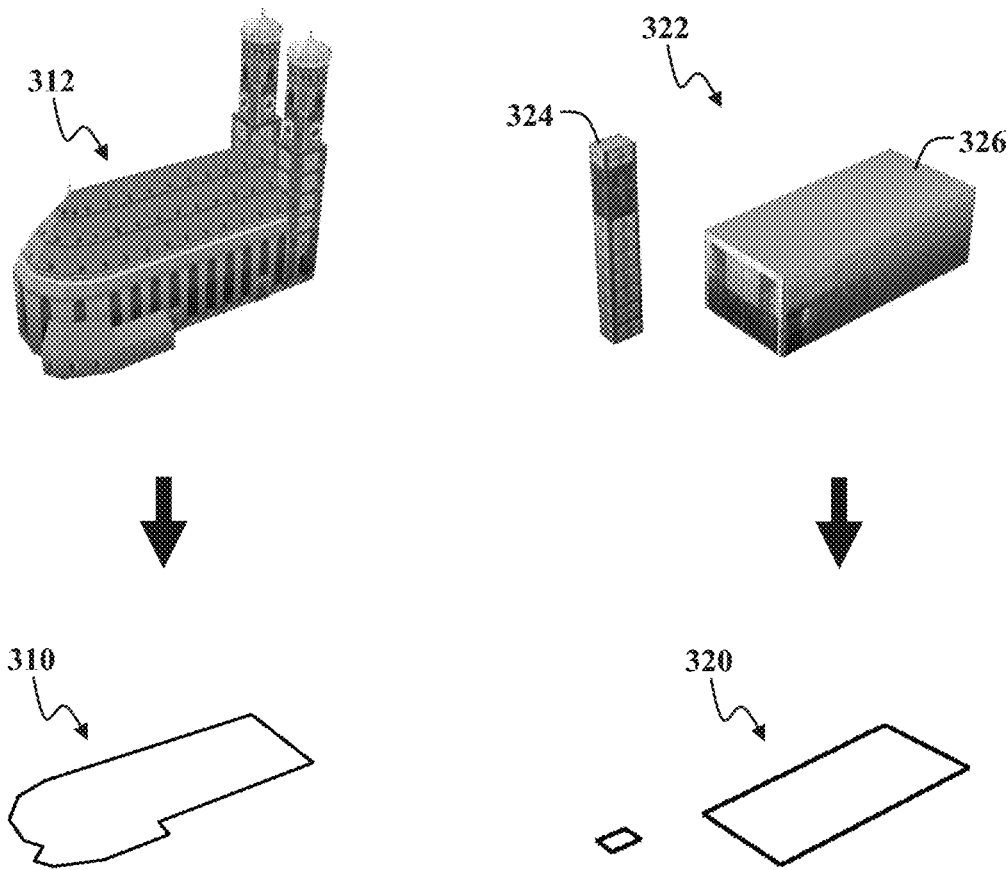
FIG. 4 shows footprints for exemplary 3D structures, which were determined using the method of FIG. 3.

FIG. 3 shows a method 200 for determining a footprint of a 3D structure in a virtual environment. The method 200 improves the functioning of the computing system 104 by enabling the processor 108 to execute a set of specific rules to efficiently and accurately determine footprints of 3D structures in a virtual environment. Particularly, the method 200 enables the processor 108 to generate high quality footprints of 3D structures based on mesh data for the 3D structures. The method is efficient enough to be used on embedded devices and mobile devices having relatively limited processing capabilities, and using a 3D structure mesh dataset that lacks any 2D footprint information or only includes oversimplified 2D footprint information. FIG. 4 shows a footprint 310 for an exemplary 3D structure 312, which was accurately determined using the method 200. Additionally, the method 200 improves the functioning of the computing system 104 by enabling the processor 108 to determine footprints of 3D structures when the input mesh data includes any number of individual separated 3D structures. Particularly, FIG. 4 further shows a footprint 320 that was accurately determined using the method 200 for an exemplary 3D structure 322 that includes a section 324 which is physically separated from a primary section 326. In this way, the method 200 has an advantage over many existing methods which cannot determine a footprint for when the mesh data includes multiple separated 3D structures.

Returning to FIG. 3, the method 200 begins with a step of receiving mesh data for at least one 3D structure (block 210). Particularly, with respect to the embodiments described in detail herein, the processor 108 is configured to receive mesh data for at least one 3D structure. The mesh data includes values regarding a plurality of vertices connected by a plurality of edges to form a plurality of polygons that form the at least one 3D structure. In one embodiment, the processor 108 is configured to read the mesh data, in particular the structure model polygon data 128, from the memory 120. However, in some embodiments, the mesh data and/or the structure model polygon data 128 is streamed to the processor 108 from a remote server on an as-needed basis, via that network device 152.

Figure 5:
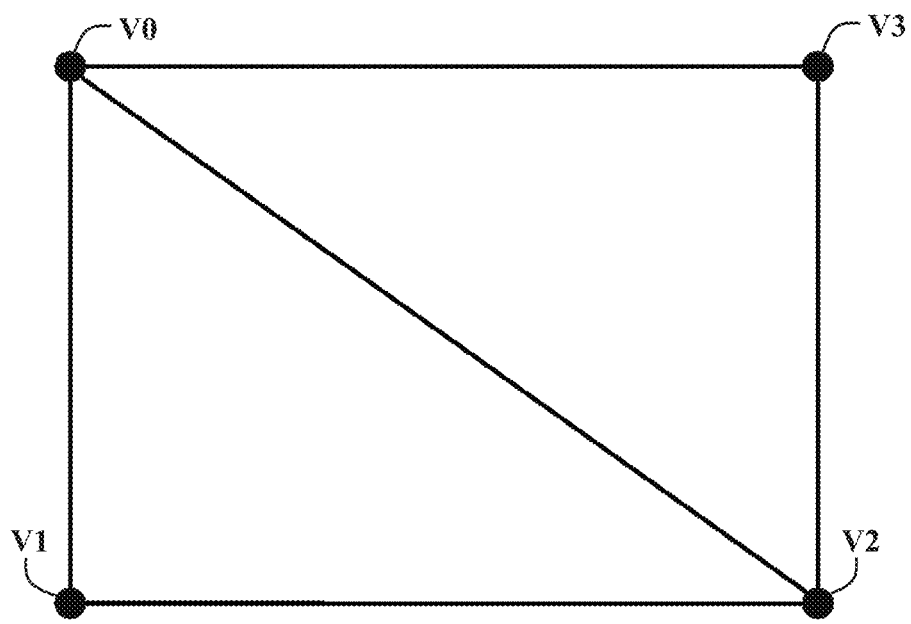
FIG. 5 illustrates an exemplary mesh data representation that may be used by the method of FIG. 3.

The mesh data can take many forms, utilizing any of various known data representations for vertices, edges, and like that correspond to a polygon mesh, such as face-vertex meshes, winged-edge meshes, half-edge meshes, quad-edge meshes, corner-tables, vertex-vertex meshes, and render dynamic meshes. FIG. 5 illustrates an exemplary mesh data representation that may be used by the method 200. Particularly, the mesh data includes an array of 3D vertex positions: [V0; V1; V2; V3], in which each vertex is represented by a position vector such as (x, y, z). Additionally, the mesh data includes primitive index array: [0, 1, 2, 0, 2, 3], which indicates how the primitives (in this case a triangle) are constructed from the vertices. As can be seen in the example of FIG. 5, four vertices V0, V1, V2, and V3 are connected by edges to form two triangles.

Returning to FIG. 3, the method 200 continues with a step of determining a connection graph based on the mesh data (block 230). Particularly, the processor 108 is configured to determine a plurality of candidate nodes and a plurality of candidate lines, some of which may form edges and vertices of the footprint of the 3D structure. The "connection graph" comprises the plurality of candidate nodes and the plurality of candidate lines. In some embodiments, the candidate nodes and candidate lines may correspond to intersections of polygons of the at least one 3D structure with a ground plane of the virtual environment, correspond to near-intersections of polygons of the at least one 3D structure with the ground plane of the virtual environment (i.e. the edges intersect with the ground or come within a predefined distance of intersecting with the ground), and/or correspond to edges of polygons that have any portion with less than a predetermined height value (i.e. the edges come close to the ground, intersect with the ground, or are below the ground). In some embodiments, the processor 108 is configured to simplify, correct, or otherwise process the connection graph in various ways, often changing the number of candidate node and candidate lines, to enable subsequent steps to be performed more efficiently and effectively.

FIG. 6 shows an exemplary implementation of the step 230 in which the connection graph is determined. The exemplary implementation of the step 230 begins with a step of initializing the connection graph with a plurality of candidate nodes and a plurality of candidate lines corresponding to all edges having any portion lower than a predefined threshold height value or within a predefined threshold distance from the ground of the virtual environment (block 232). Particularly, in one embodiment, the processor 108 is configured to identify all edges in the mesh data for the at least one 3D structure which have an ending position or vertex lower than a predefined threshold height value. Particularly, since the final goal is to generate footprints from the input mesh data, it's not necessary to consider the edges which are far above from the ground. In another embodiment, the processor 108 is configured to identify all edges in the mesh data for the at least one 3D structure which have any portion within a predefined threshold distance from the ground of the virtual environment. Particularly, in some circumstances, edges far below the ground need not be considered. Next, the processor 108 is configured to map all of the identified edges and vertices thereof onto a 2D plane corresponding to the ground of the virtual environment. The processor 108 is configured to initialize the plurality of candidate nodes as the vertices of the identified edges mapped onto the 2D plane and initialize the plurality of candidate lines as the identified edges mapped onto the 2D plane.

FIG. 7 shows an exemplary initialized connection graph 400, which comprises ten candidate nodes N0 to N9 and nine candidate lines L0 to L8. Particularly, a candidate line L0 extends between candidate nodes N0 and N1, a candidate line L1 extends between candidate nodes N1 and N2, a candidate line L2 extends between candidate nodes N2 and N3, a candidate line L3 extends between candidate nodes N3 and N0, a candidate line L4 extends between candidate nodes N4 and N5, a candidate line L5 extends between candidate nodes N5 and N6, a candidate line L6 extends between candidate nodes N6 and N7, a candidate line L7 extends between candidate nodes N7 and N4, and a candidate line L8 extends between candidate nodes N8 and N9.

Returning to FIG. 6, the exemplary implementation of the step 230 continues with a step of simplifying the connection graph by merging any candidate nodes that near one another and/or merging any candidate lines that are substantially parallel and near one another (block 234). Particularly, the processor 108 is configured to merge any candidate nodes that are within a predetermined distance from one another and/or merge any candidate lines that are within a predetermined distance from one another and within a predetermine angle with respect to one another. Since all the identified edges were mapped to the 2D ground plane, it's very likely that there are many candidate nodes are very close to each other and many candidate lines are substantially parallel and very close to each other. By merging such nodes and lines, the connection graph may be substantially simplified, thereby improving efficiency and accuracy of later steps of the method 200. In at least one embodiment, nodes or lines to be merged are merged to the position of the outermost of the nodes or lines to be merged, as viewed from overhead in the same manner as in a conventional two-dimensional map. In another embodiment, the nodes or lines to be merged, are merged to an average of the positions of the nodes or lines to be merged.

FIG. 7 illustrates an exemplary simplification 410 of the initialized connection graph 400. Particularly, as can be seen, the candidate line L8 is substantially parallel with and near the candidate line L0. Similarly, the candidate nodes N8 and N9 are very near the candidate nodes N0 and N1, respectively. In the simplified connection graph 410, the candidate line L8 is removed and/or merged with candidate the line L0. Similarly, the candidate nodes N8 and N9 are removed and/or merged with the candidate nodes N0 and N1, respectively.

Returning to FIG. 6, the exemplary implementation of the step 230 continues with a step of moving candidate nodes that are near a respective candidate line onto the respective candidate line splitting the respective candidate line into two candidate lines, each having one end at the respective candidate node (block 236). Particularly, the processor 108 is configured to move any candidate nodes that are within a predetermined distance from a respective candidate line to a nearest position that is on the candidate line. Furthermore, the processor 108 is configured to split the respective candidate line into two candidate lines, each having one end at the respective candidate node that was moved. The original 3D mesh dataset may contain some modeling errors, such as two adjacent polygons are not sharing the same edges or polygons are otherwise slightly miss aligned. Accordingly, the simplified connection graph will often contain some open gaps between the nodes and the lines. By correcting these errors in connection graph, the accuracy of the method 200 is improved.

Figure 8:
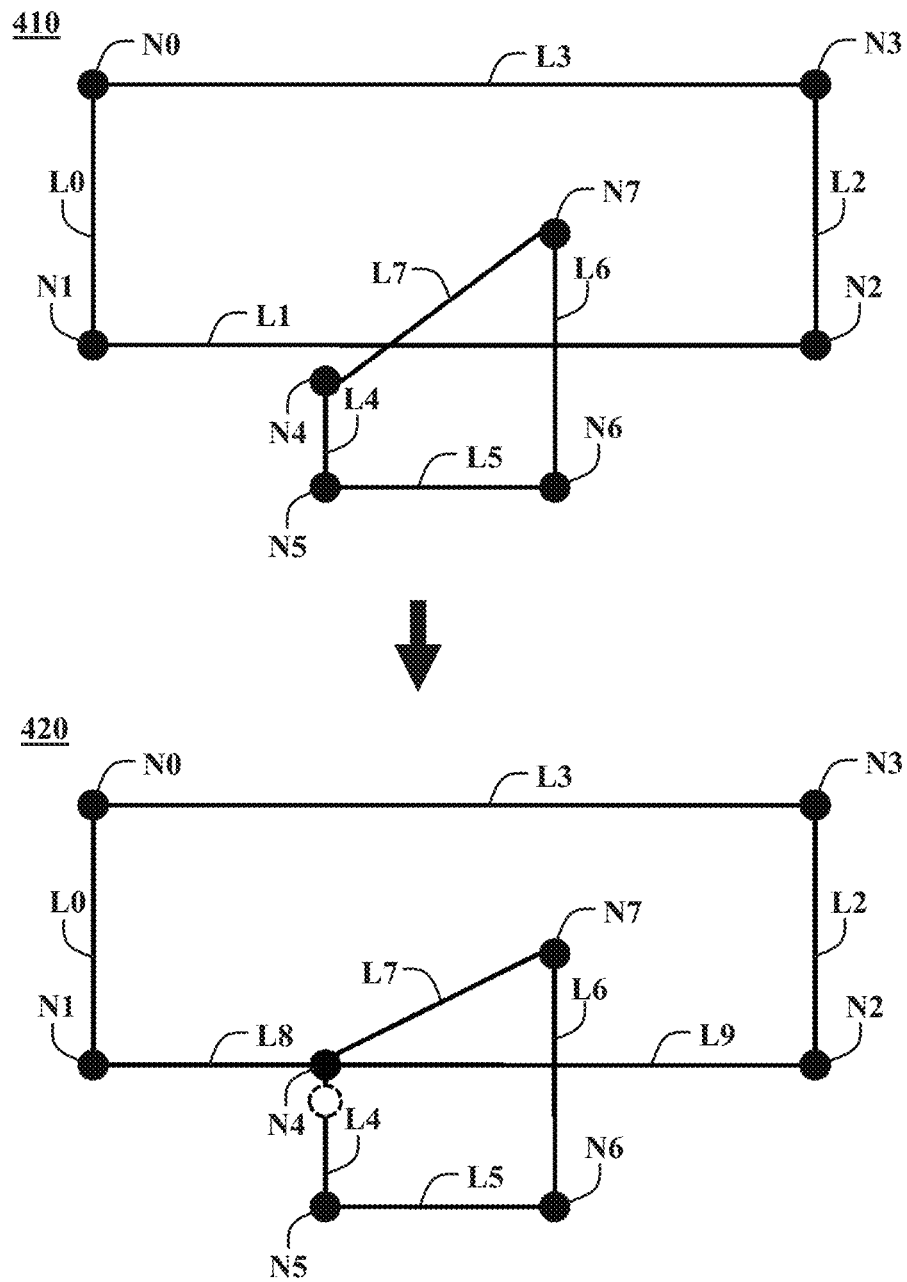
FIG. 8 illustrates an exemplary correction to the simplified connection graph of FIG. 7.

FIG. 8 illustrates an exemplary correction 420 to the simplified connection graph 410. Particularly, as can be seen, the candidate node N4 is very near the candidate line L1 but does not directly lie on the candidate line L1, suggesting a likely modeling error. In the corrected connection graph 420, the candidate node N4 is moved on the nearest position on the candidate line L1. Additionally, the candidate line L1, which extends between the candidate nodes N1 and N2, is split into two candidate lines L8 and L9. The candidate line L8 extends between the candidate node N1 and the candidate node N4, which was moved. Similarly, the candidate line L9 extends between the candidate node N2 and the candidate node N4, which was moved. Finally, the candidate lines L4 and L7, which connect to the candidate node N4, are adjusted in length and orientation as a result of the new position for the candidate node N4.

Returning to FIG. 6, the exemplary implementation of the step 230 continues with a step of generating new candidate nodes positioned at any intersection of two candidate lines and splitting each of the respective two candidate lines into two new candidate lines, each having have one end at the respective new candidate node (block 238). Particularly, the processor 108 is configured to identify any candidate lines which intersect one another and which don't have a candidate node at their intersection. Next, for each set of intersecting candidate lines, the processor 108 is configured to calculate the point of intersection of the intersecting candidate lines and generate a new candidate node at the calculated point of intersection. Furthermore, the processor 108 is configured to split each of the respective intersecting candidate lines into two candidate lines, each having one end at the newly created candidate node. In one embodiment, the processor 108 is configured to remove any candidate nodes which are only connected to a single other candidate node or connected to no other candidate nodes, and also remove the candidate lines that connect to the removed candidate nodes. Since these intersections may be vertices of the 2D footprint, the connection graph is more complete if candidate nodes are included at the intersections and the accuracy of the method 200 is thereby improved.

FIG. 9 shows illustrates an exemplary completion 430 of the corrected connection graph 420. Particularly, as can be seen, the candidate line L6 and the candidate line L9 intersect with one another, but no candidate node is positioned at the intersection. In the completed connection graph 430, a new candidate node N8 is generated at the position of the intersection of the candidate line L6 and the candidate line L9. Additionally, the candidate line L9, which extends between the candidate nodes N2 and N4, is split into two candidate lines L10 and L11 and the candidate line L6, which extends between the candidate nodes N6 and N7, is split into two candidate lines L12 and L13. The candidate line L10 extends between the candidate node N2 and the new candidate node N8. The candidate line L11 extends between the candidate node N4 and the new candidate node N8. The candidate line L12 extends between the candidate node N6 and the new candidate node N8. Finally, the candidate line L13 extends between the candidate node N7 and the new candidate node N8.

Returning to FIG. 3, the method 200 continues with a step of determining an adjacency list based on the connection graph (block 250). Particularly, after determining the connection graph, the processor 108 is configured to determine, for each candidate node of the connection graph, which other candidate nodes are connect to the respective node by a candidate line. In one embodiment, the processor 108 is configured to determine, for each candidate node of the connection graph, which candidate lines include the respective candidate node and then generate an array which includes the indices for the other candidate node included in each of the respective candidate lines. The "adjacency list" comprises the generated arrays of connected nodes paired with each candidate node of the connection graph.

FIG. 10 shows an exemplary adjacency list for the completed connection graph, illustrated in the form of a table 500. As shown in the table 500, it was determined that the candidate node N0 connects to the candidate nodes N1 and N3, that the candidate node N1 connects to the candidate nodes N0 and N4, that the candidate node N2 connects to the candidate nodes N3 and N8, that the candidate node N3 connects to the candidate nodes N0 and N2, that the candidate node N4 connects to the candidate nodes N1, N5, N7, and N8, that the candidate node N5 connects to the candidate nodes N4 and N6, that the candidate node N6 connects to the candidate nodes N5 and N8, that the candidate node N7 connects to the candidate nodes N4 and N8, and that the candidate node N8 connects to the candidate nodes N2, N4, N6, and N7.

Returning to FIG. 3, the method 200 continues with a step of generating at least one 2D footprint of the at least one 3D structure based on the connection graph and the adjacency list (block 270). Particularly, the processor 108 is configured to identify vertices and edges corresponding to a 2D footprint of the at least on 3D structure of the mesh data, the identified vertices and edges being selected from the candidate nodes and candidate lines of the connection graph based on the determined adjacency list.

Figure 11:
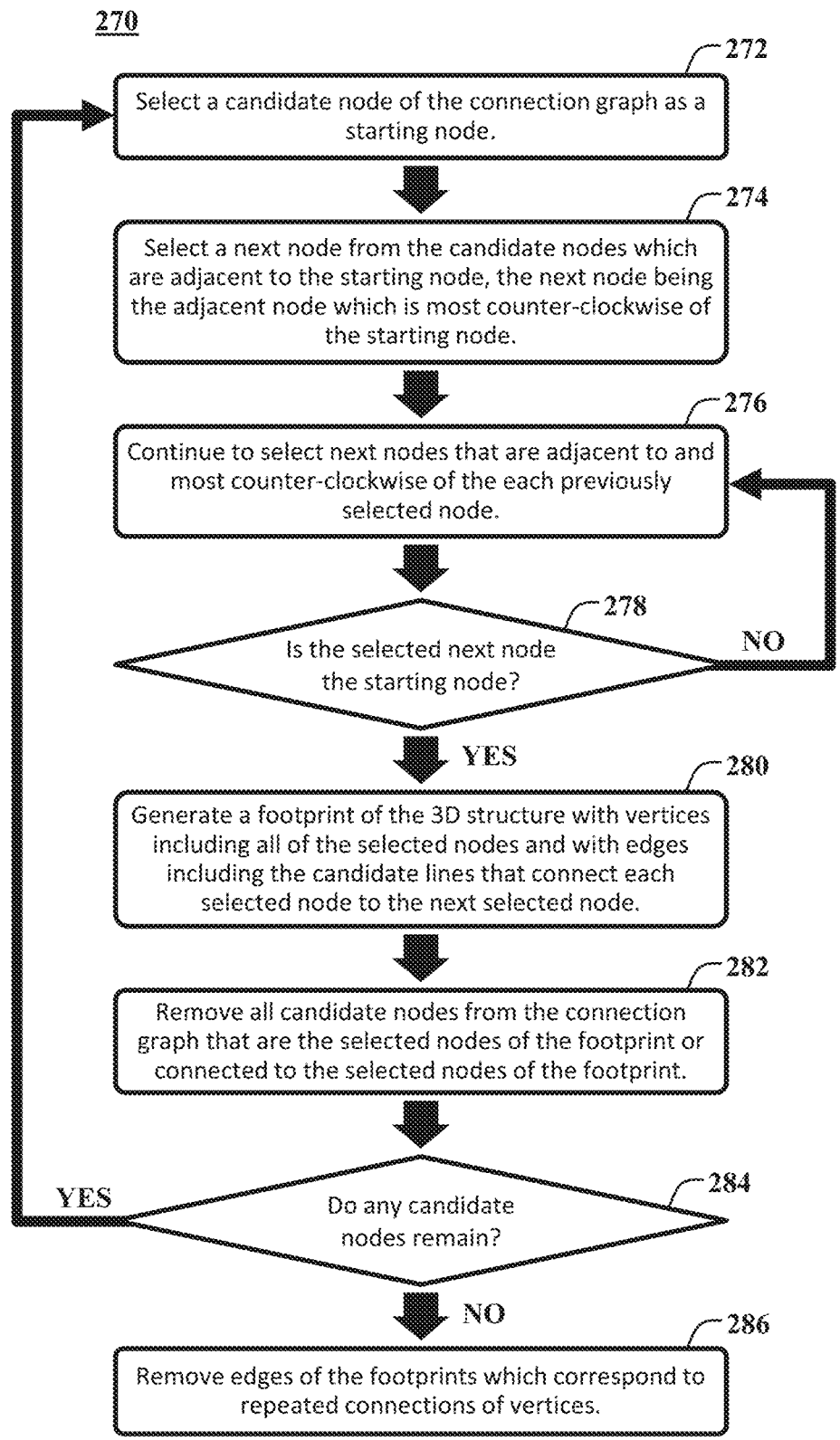
FIG. 11 shows an exemplary process for generating the 2D footprint of the at least one 3D structure based on the connection graph and adjacency list.

FIG. 11 shows a method of implementing the step 270 in which the at least one 2D footprint of the at least one 3D structure is identified. The exemplary implementation of the step 270 begins with a step of selecting a candidate node of the connection graph as a starting node (block 272). Particularly, the processor 108 is configured to select one of the candidate nodes of the connection graph to use as an initial starting node $n_s$. In one embodiment, the processor 108 is configured select the initial starting node $n_s$ as the right-most candidate node from the connection graph, as viewed from overhead in the same manner as in a conventional two-dimensional map. However, in other embodiments, the processor 108 is configured to select as the initial starting node $n_s$ as the left-most candidate node, the top-most candidate node, the bottom-most candidate node, or any random outermost candidate node, as viewed from overhead in the same manner as in a conventional two-dimensional map. In the example shown in FIG. 12, the right-most candidate node N3 of the complete connection graph 430 is selected as the initial starting node $n_s$.

Returning to FIG. 11, the exemplary implementation of the step 270 continues with a step of selecting a next node from the candidate nodes which are adjacent to the starting node, the next node being the adjacent node which is most counter-clockwise of the starting node, which is the rightmost node of the complete connection graph of the algorithm (block 274). Particularly, the processor 108 is configured to determine which candidate nodes are adjacent to the initial starting node $n_s$ based on the adjacency list. Next, the processor 108 is configured to select as a next node $n_{next}$ the adjacent candidate node that is most counterclockwise in orientation with from the initial starting node $n_s$. In one embodiment, the processor 108 is configured to select the adjacent candidate node that satisfies the following equation:

$$\forall n_p \in \text{Adj}_{n_s}: n_p \neq n_{next} \rightarrow (n_{next}-n_s) \times (n_p-n_s) < 0 \quad (1).$$

In other words, for each possible selection of a next node $n_{next}$ from the adjacent nodes $\text{Adj}_{n_s}$ to the initial starting node $n_s$, the processor 108 is configured to determine whether, for all adjacent nodes $\text{Adj}_{n_s}$ other than the selected next node $n_{next}$, the cross product or vector product of (1) a first intermediate 2D vector equal to the position vector of the next node $N_{next}$ minus the position vector of the initial starting node $n_s$, with (2) a second intermediate 2D vector equal to the position vector of the respective adjacent node $n_p$ minus the position vector of the initial starting node $n_s$, is less than zero. The processor 108 is configured to select the one of the adjacent nodes $\text{Adj}_{n_s}$ in which the condition is satisfied. This counterclockwise oriented selection process generates nodes move in a clockwise rotation, starting from the selected starting node. In some embodiments, a clockwise oriented selection process can be used and the process and equation above can be appropriately modified for clockwise oriented selection. In the example shown in FIG. 12, the candidate node N2 of the complete connection graph 430 is selected as the next node $n_{next}$ from the initial starting node $n_s$.

Returning to FIG. 11, the exemplary implementation of the step 270 continues with steps of continuing to select next nodes that are adjacent to and most counter-clockwise of the previously selected node (block 276) until the selected next node is the starting node (block 278). Particularly, for each currently selected node $n_{current}$, the processor 108 is configured to determine which candidate nodes are adjacent to the currently selected node $n_{current}$ based on the adjacency list. Next, the processor 108 is configured to select as a next node $n_{next}$ the adjacent candidate node that is most counter-clockwise in orientation with respect to the orientations of the currently selected node $n_{current}$ and the previously selected node $n_{prev}$. In one embodiment, the processor 108 is configured select the adjacent candidate node such that a counterclockwise orientation value O between the 2D vector $V_1 = n_{next} - n_{current}$ and the 2D vector $V_0 = n_{current} - n_{prev}$ is largest. In one embodiment, the value O is calculated according to the equation:

$$O = f(V_1, V_0) = \begin{cases} -V_1 \cdot V_0 - 1.0 & \text{if } V_1 \times V_0 < 0 \\ V_1 \cdot V_0 + 1.0 & \text{otherwise} \end{cases} \quad (2)$$

In other words, for each possible selection of a next node $n_{next}$ from the adjacent nodes $\text{Adj}_{n_{current}}$ to currently selected node $n_{current}$, the processor 108 is configured to calculate the value O. For each value O to be calculated, the processor 108 is configured to calculate the 2D vector $V_1 = n_{next} - n_{current}$ and the 2D vector $V_0 = n_{prev} - n_{current}$. Next, for each value O to be calculated, if the cross product of 2D vector $V_1$ with the 2D vector $V_0$ is less than zero, the processor 108 is configured calculate the value O as the dot product or scalar product of the negative of the vector $V_1$ with the vector $V_0$, minus one. Otherwise, if the cross product of vector $V_1$ with the vector $V_0$ is not less than zero, then the processor 108 is configured calculate the value O as the dot product or scalar product of the vector $V_1$ with the vector $V_0$, plus one. The processor 108 is configured select as the next node $n_{next}$ the adjacent candidate node for which the counterclockwise orientation value O is largest. The processor 108 is configured to repeat the selection of next nodes $n_{next}$ until the selected next node is the initial starting node $n_s$. In some embodiments, a clockwise oriented selection process can be used and the process and equation above can be appropriately modified for clockwise oriented selection. In the example shown in FIG. 12, the sequence of nodes selection from the complete connection graph 430 includes N3→N2→N8→N6→N5→N4→N1→N0→N3. The selection process was stopped when the selection process returned to the starting node N3.

Returning to FIG. 11, once the node selection process has returned to the starting node, the exemplary implementation of the step 270 continues with a step of generating a footprint of the 3D structure with vertices including all of the selected nodes and with edges including the candidate lines that connect each selected node to the next selected node (block 280). Particularly, the processor 108 is configured to generate a footprint for a 3D structure of the mesh data having vertices at the positions of all the selected candidate nodes and having edges corresponding to the candidate lines that connect each selected candidate node to the next selected candidate node. In the example shown in FIG. 12, the footprint 440 is generated having vertices V0-V7 corresponding to the sequence of selected candidate nodes N3, N2, N8, N6, N5, N4, N1, and N0, respectively, and edges E0-E7 corresponding to the candidate lines L2, L10, L12, L5, L4, L8, L0, and L3, respectively.

Returning to FIG. 11, the exemplary implementation of the step 270 continues with a step of removing all candidate nodes from the connection graph that are the selected nodes of the footprint or connected to the selected nodes of the footprint (block 282). Particularly, the processor 108 is configured to remove from the connection graph all candidate nodes that are the selected nodes of the footprint or connected by one or more candidate lines and nodes to the selected candidate nodes used to form the footprint. In the example shown in FIG. 12, all of candidate nodes are removed, including the candidate node N7, which was not used to form the footprint, because it is connected to the nodes used to form the footprint. However, in many cases, connection graph includes several clusters of candidate nodes and lines which are isolated from one another and generally correspond to separate 3D structures of the mesh data.

Next, the exemplary implementation of the step 270 repeating the steps 272-282 if there are any candidate nodes remaining in the connection graph (block 284). Particularly, the processor 108 is configured to check whether there are any remaining candidate nodes in the connection graph, such as a cluster of candidate nodes and lines that are isolated from the nodes and lines that comprised the generated footprint. If so, the processor 108 is configured to repeat the above described process to generate a further footprint of a further 3D structure in the mesh data.

Finally, once there are no remaining candidate nodes in the connection graph, the exemplary implementation of the step 270 continues with a step of post-processing the footprints by removing edges of the footprints which correspond to repeated connections of vertices (block 286). Particularly, the processor 108 is configured to remove any edges corresponding to repeated connections of vertices in the footprint, thereby dividing the footprint into two or more footprints. As an example, FIG. 13 illustrates a footprint 600 formed from a sequence of vertices A→B→C→D→E→F→D→C→A. Based on the sequence, the footprint includes an edge C→D and also an edge D→C. Since this connection between the two vertices C and D is repeated, all edges corresponding to the path are removed from the footprint, resulting in the decomposition 610 in which the footprint is divided into two footprints, A→B→C→A and D→E→F→D.

Finally, returning to FIG. 3, the method 200 continues with a step of outputting the generated footprint of the at least one 3D structure (block 290). Particularly, the processor 108 is configured to output and/or store in the memory the generated footprints. In one embodiment, the processor 108 is further configured to render 2D or 3D graphics using the generated footprints of the at least one 3D structure of the mesh data. In one embodiment, processor 108 is configured to use the determined footprints to render a 2D preview of a map area including the 3D structures shown as 2D footprints. In one embodiment, processor 108 is configured to use the determined footprints to render a context aware map visualization solution (e.g. time and environment aware). In one embodiment, processor 108 is configured to use the determined footprints to perform an occupation test for a map area. In one embodiment, processor 108 is configured to use the determined footprints to implement soft shadow simulation for rendering soft shadows. In one embodiment, processor 108 is configured to use the determined footprints to rendering 2D or 3D graphics having variable a level of detail displayed.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for determining a two-dimensional (2D) footprint of a three-dimensional (3D) structure in a virtual environment, the method comprising:
   receiving, with a processor, mesh data for at least one 3D structure, the mesh data including positions of a plurality of vertices which are connected by a plurality of edges to form a plurality of polygons that form the at least one 3D structure;
   determining, with the processor, a connection graph including a plurality of candidate nodes and a plurality of candidate lines by (i) identifying all edges in the plurality of edges having a vertex that is less than threshold height value, and (ii) determining the plurality of candidate lines and the plurality of candidate nodes by mapping the identified edges and vertices thereof onto a 2D plane;
   determining, with the processor, an adjacency list that indicates, for each candidate node in the plurality of candidate nodes, which other candidate nodes in the plurality of candidate nodes are connected to the respective candidate node by a candidate line in the plurality of candidate lines; and
   generating, with the processor, a footprint of the at least one 3D structure based on the connection graph and the adjacency list, the footprint including vertices corresponding to a selected group of candidate nodes from the plurality of candidate nodes and including edges corresponding to a selected group of candidate lines from the plurality of candidate lines.

2. The method according to claim 1, the determining of the connection graph further comprising at least one of:
   merging candidate nodes in the plurality of candidate nodes that are within a predetermined distance of one another; and
   merging candidate lines in the plurality of candidate lines that are within a predetermined distance of one another and at less than a predetermined angle with respect to one another.

3. The method according to claim 1, the determining of the connection graph further comprising:
   moving a candidate node in the plurality of candidate nodes that is within a predetermined distance from a respective candidate line in the plurality of candidate lines onto the respective candidate line; and
   splitting the respective candidate line into two candidate lines, each having one end at the moved candidate node.

4. The method according to claim 1, the determining of the connection graph further comprising:
   generating a new candidate node positioned at an intersection of two respective candidate lines in the plurality of candidate lines; and
   splitting the each of the two respective candidate lines into two new candidate lines, each having one end at the generated new candidate node.

5. The method according to claim 1, the determining of the connection graph further comprising:
   removing a candidate node in the plurality of candidate nodes that is one of (i) only connected to a single other candidate node in the plurality of candidate nodes and (ii) connected to no other candidate node in the plurality of candidate nodes; and
   removing any candidate lines in the plurality of candidate lines that connect to the removed candidate node.

6. The method according to claim 1, the generating of the footprint of the at least one 3D structure further comprising:
   selecting a starting candidate node from the plurality of candidate nodes; and
   sequentially selecting a first sequence of candidate nodes from the plurality of candidate nodes, a first candidate node in the first sequence of candidate nodes being connected to the starting candidate node, each candidate node other than first candidate node in the first sequence of candidate nodes being connected to a previous respective candidate node in the first sequence of candidate nodes,
   wherein the selected group of candidate nodes comprises a second sequence of candidate nodes formed by the selected starting candidate node with the selected first sequence of candidate nodes, and
   wherein the selected group of candidate lines comprises a first sequence of candidate lines in the plurality of candidate lines that sequentially connect the second sequence of candidate nodes.

7. The method according to claim 6, wherein positions of the candidate nodes of the second sequence of candidate nodes move in a clockwise rotation, starting from the selected starting candidate node.

8. The method according to claim 6, further comprising:
   removing, with the processor, (i) the selected group of candidate nodes and any candidate nodes in the plurality of candidate nodes that are connected to the selected group of candidate nodes from the plurality of candidate nodes of the connection graph and (ii) the selected group of candidate lines and any candidate lines in the plurality of candidate lines that are connected to the selected group of candidate lines from the plurality of candidate lines of the connection graph; and generating, with the processor, a further footprint of the at least one 3D structure based on the connection graph and the adjacency list in response to candidate nodes remaining in plurality of candidate nodes and candidate lines remaining in the plurality of candidate lines after the removing.

9. The method according to claim 6, the generating of the footprint of the at least one 3D structure further comprising:
removing edges from the footprint that correspond to candidate lines that are repeated in the first sequence of candidate lines that sequentially connect the second sequence of candidate nodes.

10. The method according to claim 1, further comprising:
rendering, with the processor, graphics using the generated footprint of the at least one 3D structure;
displaying the rendered 3D graphics on a display device operably connected to the processor.

11. A graphical display system for comprising:
a display device;
a memory; and
a processor operatively connected to the display device and the memory, the processor being configured to:
receive mesh data for at least one three-dimensional (3D) structure, the mesh data including positions of a plurality of vertices which are connected by a plurality of edges to form a plurality of polygons that form the at least one 3D structure;
determine a connection graph including a plurality of candidate nodes and a plurality of candidate lines by (i) identifying all edges in the plurality of edges having a vertex that is less than threshold height value, and (ii) determining the plurality of candidate lines and the plurality of candidate nodes by mapping the identified edges and vertices thereof onto a two-dimensional (2D) plane;
determine an adjacency list that indicates, for each candidate node in the plurality of candidate nodes, which other candidate nodes in the plurality of candidate nodes are connected to the respective candidate node by a candidate line in the plurality of candidate lines; and
generate a footprint of the at least one 3D structure based on the connection graph and the adjacency list, the footprint including vertices corresponding to a selected group of candidate nodes from the plurality of candidate nodes and including edges corresponding to a selected group of candidate lines from the plurality of candidate lines.

12. The graphical display system according to claim 11, the processor being further configured to:
merge candidate nodes in the plurality of candidate nodes that are within a predetermined distance of one another; and
merge candidate lines in the plurality of candidate lines that are within a predetermined distance of one another and at less than a predetermined angle with respect to one another.

13. The graphical display system according to claim 11, the processor being further configured to:
move a candidate node in the plurality of candidate nodes that is within a predetermined distance from a respective candidate line in the plurality of candidate lines onto the respective candidate line; and split the respective candidate line into two candidate lines, each having one end at the moved candidate node.

14. The graphical display system according to claim 11, the processor being further configured to:
generate a new candidate node positioned at an intersection of two respective candidate lines in the plurality of candidate lines; and
split the each of the two respective candidate lines into two new candidate lines, each having one end at the generated new candidate node.

15. The graphical display system according to claim 11, the processor being further configured to:
remove a candidate node in the plurality of candidate nodes that is one of (i) only connected to a single other candidate node in the plurality of candidate nodes and (ii) connected to no other candidate node in the plurality of candidate nodes; and
remove any candidate lines in the plurality of candidate lines that connect to the removed candidate node.

16. The graphical display system according to claim 11, the processor being further configured to:
select a starting candidate node from the plurality of candidate nodes; and
sequentially select a first sequence of candidate nodes from the plurality of candidate nodes, a first candidate node in the first sequence of candidate nodes being connected to the starting candidate node, each candidate node other than first candidate node in the first sequence of candidate nodes being connected to a previous respective candidate node in the first sequence of candidate nodes,
wherein the selected group of candidate nodes comprises a second sequence of candidate nodes formed by the selected starting candidate node with the selected first sequence of candidate nodes, and
wherein the selected group of candidate lines comprises a first sequence of candidate lines in the plurality of candidate lines that sequentially connect the second sequence of candidate nodes.

17. The graphical display system according to claim 16, wherein positions of the candidate nodes of the second sequence of candidate nodes move in a clockwise rotation, starting from the selected starting candidate node.

18. The graphical display system according to claim 16, the processor being further configured to:
remove (i) the selected group of candidate nodes and any candidate nodes in the plurality of candidate nodes that are connected to the selected group of candidate nodes from the plurality of candidate nodes of the connection graph and (ii) the selected group of candidate lines and any candidate lines in the plurality of candidate lines that are connected to the selected group of candidate lines from the plurality of candidate lines of the connection graph; and
generate a further footprint of the at least one 3D structure based on the connection graph and the adjacency list in response to candidate nodes remaining in plurality of candidate nodes and candidate lines remaining in the plurality of candidate lines after the removing.

19. The graphical display system according to claim 16, the processor being further configured to:
remove edges from the footprint that correspond to candidate lines that are repeated in the first sequence of candidate lines that sequentially connect the second sequence of candidate nodes.

20. The graphical display system according to claim 11, the processor being further configured to:

render graphics using the generated footprint of the at least one 3D structure;
operate the display device to display the rendered 3D graphics.

* * * * *